United States Patent [19]

Boden et al.

[11] Patent Number: 4,472,340
[45] Date of Patent: Sep. 18, 1984

[54] METHOD FOR PRODUCING TIRE-SHAPED ARTICLES FROM POLYURETHANE MULTI-COMPONENT REACTION MATERIALS

[75] Inventors: Heinrich Boden, Leverkusen; Gerhard Just, Leichlingen; Bernhard Rentz, Leverkusen, all of Fed. Rep. of Germany

[73] Assignee: Bayer Aktiengesellschaft, Leverkusen, Fed. Rep. of Germany

[21] Appl. No.: 183,475

[22] Filed: Sep. 2, 1980

[30] Foreign Application Priority Data

Sep. 12, 1979 [DE] Fed. Rep. of Germany ...... 2936788

[51] Int. Cl.³ .................. B29C 5/04; B29H 17/02; B29H 3/00
[52] U.S. Cl. .................. 264/255; 264/311; 425/130
[58] Field of Search ............... 425/35, 129 R, 128, 425/112, 130; 264/311, 45.7, 255

[56] References Cited

U.S. PATENT DOCUMENTS

| | | | |
|---|---|---|---|
| 2,897,540 | 8/1959 | Rhodes | 425/112 X |
| 3,457,594 | 7/1969 | Baudou | 425/128 X |
| 3,645,655 | 2/1972 | Beneze | 264/311 X |
| 3,751,551 | 8/1973 | McGillvary | 264/311 |
| 3,924,982 | 12/1975 | Yang et al. | 425/35 |
| 4,313,909 | 2/1982 | Boden et al. | 422/133 |

FOREIGN PATENT DOCUMENTS 1128608 9/1968 United Kingdom .
1139643 1/1969 United Kingdom .

Primary Examiner—Jan Silbaugh
Assistant Examiner—Hubert C. Lorin
Attorney, Agent, or Firm—Gene Harsh; Joseph C. Gil; Lyndanne M. Whalen

[57] ABSTRACT

The instant invention is directed to a method for producing hollow articles which are open toward the axis, are rotationally symmetrical and symmetrical with respect to a central plane produced from polyurethane multi-component reaction materials by the reaction casting method, a mold core being required during production for generating the cavity in the article, and the reaction mixture being supplied from the rotational axis via feed channels to a mold cavity, comprising: supplying a reaction mixture alternately to each side of the mold cavity, the article thus being built up symmetrically with respect to the rotational axis.

5 Claims, 2 Drawing Figures

METHOD FOR PRODUCING TIRE-SHAPED ARTICLES FROM POLYURETHANE MULTI-COMPONENT REACTION MATERIALS

BACKGROUND OF THE INVENTION

The invention relates to a method of producing hollow articles which are opened toward their axis, are rotationally symmetrical and are symmetrical about a central plane, from polyurethane multi-component reaction materials by the reaction casting method. A core mold is needed during production to generate the cavity and the reaction mixture is fed from the rotational axis via feed channels to the mold cavity. In particular, it is possible to produce pneumatic tires which are made up of differing polyurethane elastomers, for example, with a flexible tread mixture which can also be reinforced, a rigid casing mixture which can optionally also be reinforced and a flexible bead mixture.

Vehicle tires made of polyurethane reaction materials consisting of differing reaction systems are known. A separately produced casing composition is cast around it, for example, in another mold having a tread. As the adhesion of the tread to the casing surface is insufficient under dynamic stress in this case, attempts have been made to introduce the tread mixture and to subsequently load in the casing mixture from one side once the tread has solidified. However, since the rear of the tread is inevitably designed cylindrically by the centrifugal process, the lateral transition of the tread which is usually cambered in the casing region can only be achieved if the tire zenith is extremely thick. In this method, it is only possible to work with slightly reactive casing materials since the liquid casing mixture has to be displaced from the feed position past a bead on the rear of the tread to a second bead before the viscosity is allowed to increase. This method of production becomes even more difficult if reinforcing inlays are used since they reduce the cross-sectional area between the rear of the already cast tread and the mold core in the zenith region. In addition to the time required for the tread mixture to solidify, the associated shrinkage of the tread from the mold surface is also disadvantageous for economic production because reaction mixture can enter the gap between the shrunk tread and the mold surface as the casing is cast.

Attempts have been made to insert two additional mixheads on each bead in order to cast the second casing reaction mixture onto a still liquid tread mixture. However, an apparatus of this type is very bulky and rarely used because of the size of the mixheads necessary for the production of passenger vehicle tires. Ventilation through the feed slots on the two beads becomes very difficult and is only possible at a very slow entry speed and thus with partially opened feed channels. Highly reactive materials cannot be processed in this way. The reliability of production and operation is impaired by the double number of matering units, mixheads, pipe and tube lines, distributor and manipulators.

A BRIEF DESCRIPTION OF THE DRAWINGS

DESCRIPTION OF THE INVENTION

Figure 1:
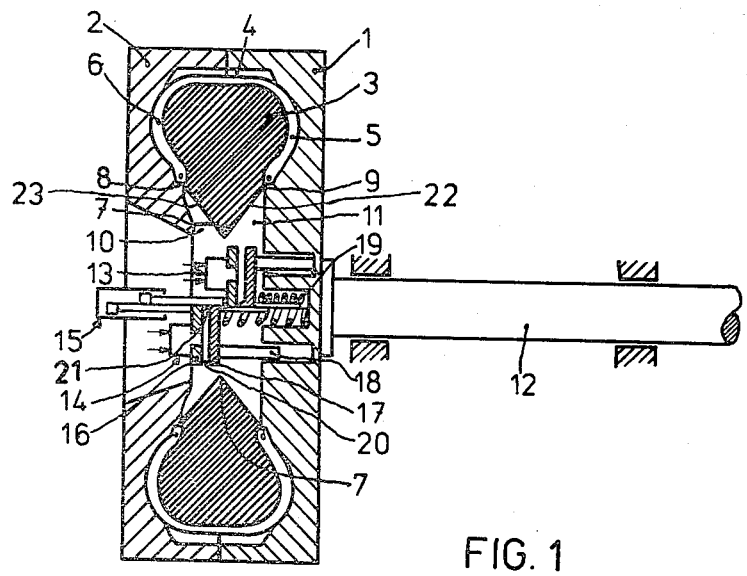
FIG. 1 shows a centrifugal apparatus with an axially movable mixing and feed means.

It has accordingly been found, that in particular, vehicle tires made of several differing layers of polyurethane multi-component reaction materials built up on each other symmetrically can be produced in short cycle times if, in particular, the casing and the tire beads are produced by the method according to the present invention. The invention relates to a method in which the reaction mixture is fed alternately in equal quantities to each side of the mold cavity. The article is built up symmetrically about the rotational axis. In particular, the composition of the reaction mixture can be varied during production with this method. Apparatuses for carrying out this method may comprise centrifugal casting mold with a core for the tire-like configuration, a casting tool containing the mixing apparatus and feed devices characterized in that the casting tool is axially movable in the tire axis and is designed in such a way that the reaction mixture can only enter one side of the mold cavity at a time. The mold cavity is symmetrical about the central plane and the movement of the casting tool as well as the duration of casting are coordinated with the rotational speed of the mold in such a way that a structure which is substantially uniform with respect to the central plane and also with respect to the rotational axis is achieved. Another apparatus which may be used in carrying out the method of the present invention is characterized in that the casting tool containing the mixing apparatus actually lies in the central plane of the mold and a guide system which allows the reaction mixture to flow alternately into one half of the mold at any time, is arranged on the core mold toward the rotational axis.

A particular advantage of this method and the described apparatuses lies in the fact that vehicle tires can be produced from several differing layers of multi-component reaction materials which are built up symmetrically, in particular, from those which form polyurethanes, in short cycle times. In particular, the production process is not obstructed by the reinforcing inlays. To produce the tread, it would not generally be necessary to introduce the reaction mixture into the rotational mold alternately from both sides. The tread could also be produced in other known ways. However, due to the possibility that the reaction mixture will flow into only one half of the mold (by means of axial movement of the mixhead or the special guide system mentioned before) it is possible and worthwhile to produce the whole tire including the bead regions by the method according to the invention. A very symmetrical structure is achieved both with respect to the tire axis and with respect to the central plane of the tire. The shape and size of the tire can vary within wide limits. The feed openings, when not in use, act as ventilation ducts. Relatively highly reactive mixtures can be used. The transition, which can be accurately adjusted, from the flexible tread via a medium-rigid intermediate layer to a rigid casing is also particularly advantageous. At the end, it is possible to switch back to a flexible mixture which forms the sealing region of the annular bead. Highly reactive multi-component materials whose solidifying time is shorter than the filling time of the mold can be processed due to the layered structure from the outside inwards. Most of the shrinkage occurring during solidification is taken up during the casting process. Bubbles in the reaction mixture produced by the reinforcing inlays or by turbulence are inevitably located in the still low-viscosity phase of the reaction composition and travel inwards at the high circumferential speeds of the centrifugal mold due to the differences in density with the fill level of the liquid reaction composition which is being built up. One apparatus which may be used in the practice of the present invention is illustrated by way of example below and the method described in more detail.

The apparatus in FIG. 1 comprises the two mold halves 1 and 2 forming the outer form of the tire, the mold core 3 whose outer contour defines the mold cavity for the tread 4, the casing regions 5 and 6, as well as the feed openings 8 and 9, and the feed channels 10 and 11, in its feed region 7. The tool is joined to a drive shaft 12. The mixing apparatus consists of the two injection mixheads 13 and 14 which are designed to be self-cleaning and which are arranged in a baffle plate 16 which does not rotate but which can be moved axially with the aid of the piston cylinder unit 15. The baffle plate 16 forms the dynamic subsequent mixer with the baffle plate 17. The baffle plate 17 is mounted rotationally symmetrically with the mold half 1 by means of guide bolts 18 and is moved axially by a spring 19 to a stop. The baffle plate 17 rotates with the centrifugal mold. The baffle plate 17 is supported relative to the non-rotating baffle plate 16 by the rotationally symmetrical projection 21 and thus forms the mixing gap 20. The mixing apparatus consisting of the elements 13, 14, 16, 17, 18, 19, 20 can be reversed from the position shown in the upper half of FIG. 1 (feeding via the feed channel 11 and feed opening 9) into the position shown a the bottom (feeding via feed channel 10 and feed opening 8) at predeterminable, exactly equal time intervals during the centrifugal process with the aid of the piston cylinder unit 15. In this process, the reaction mixture is conveyed alternately to the feed surface 22 or 23 of the feed region 7 allocated to the feed channel as it leaves the subsequent mixer. This alternate oscillating reversing movement is synchronized with the speed of the centrifugal casting apparatus so that at least one rotation of the centrifugal casting apparatus is allocated to a reversing process at any time. This ensures that the reaction mixture entering the mold cavity 4, 5, 6 from at least one of the injection mixers 13 and 14 via the mixing gap 20 alternately into the feed channels 10 and 11 via the associated feed openings 8 and 9 is metered uniformly in small steps in both casings and bead regions 5 and 6 after filling the tread region 4. It is essential to the invention that these regions 5 and 6 are filled almost symmetrically by the reaction mixture which is building up from the outside inwards and are simultaneously ventilated in a simple, advantageous manner via the feed openings 8 and 9.

In theory, simple injection and stirrer mixers whose delivery pipe with feed channel is arranged so that it can move axially synchronously with the speed of the centrifugal casting apparatus can also be used instead of the advantageous mixing apparatus described here. They cannot, however, even for reasons of space, be effective if they are overlapping each other. They can be used in combination with a dynamic subsequent mixer which is designed to be substantially self-cleaning and which improves the mixed material of each individual reaction mixture. The dynamic subsequent mixer has the further advantage that the reaction mixture issues from the subsequent mixer uniformly distributed over its periphery through its mixing gap which is designed as self-cleaning by means of the centrifugal acceleration of the reaction composition. Due to the larger outlet cross-sectional area and thus the smaller, more readily controllable outlet speed of the reaction mixture, this type of feed is often preferred to the use of a mixhead having a delivery pipe and a feed channel which is usually not self-cleaning.

Figure 2:
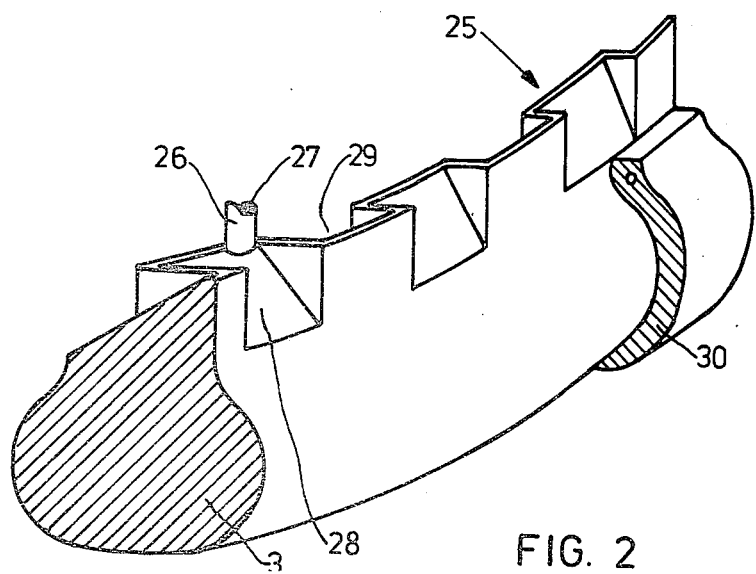
FIG. 2 shows a core mold with a line system.

With the apparatus illustrated in FIG. 2, the stream is divided and deflected by a guide system 25 arranged on the core 3 towards the rotational axis. Of the mixing and casting apparatus (not shown) which is stationary during the mold filling operation, only the delivery pipe 26, with the casting or feed channel 27 which is disposed in the central plane, is illustrated. The reaction mixture is guided symmetrically on to the two treads 28 and 29, and this also leads to a tire structure (indicated schematically by 30) which is substantially uniform with respect to the central plane and the rotational axis.

Instead of the delivery pipe 26 with a casting or feed channel 27 which is illustrated for the sake of clarity, it is also possible and advantageous to use substantially self-cleaning mixing and casting apparatuses with dynamic subsequent mixers, for example, according to FIG. 1.

What is claimed is:

1. A method for producing hollow articles which are open toward the axis, are rotationally symmetrical and symmetrical with respect to a central plane produced from polyurethane multi-component reaction materials by the reaction casting method, a mold core being required during production for generating the cavity in the article, and the reaction mixture being supplied from the rotational axis via feed channels to a mold cavity, comprising: supplying a reaction mixture alternately to each side of the mold cavity, the article thus being built up symmetrically with respect to the rotational axis.

2. The method of claim 1, wherein said reaction mixture composition is changed at least once while the hollow article is being built up.

3. The method of claim 1, wherein said multicomponent reaction mixture is premixed in a self-cleaning injection mixer and is subsequently mixed in a mixer arranged upstream of the feed channels.

4. The method of claim 1, wherein said reaction mixture is supplied through an axial to-and-fro movement of the casting apparatus lying in the rotational axis, determined by the rotational speed of the mold.

5. The method of claim 1, wherein said reaction mixture is supplied through a guide system on the core, which in the case of a casting apparatus, does not move axially.

* * * * *